(12) United States Patent
Suryanarayana et al.

(10) Patent No.: US 11,500,449 B1
(45) Date of Patent: Nov. 15, 2022

(54) ADAPTIVE REMEDIATION FOR MODERN STANDBY

(71) Applicant: Dell Products L.P., Round Rock, TX (US)

(72) Inventors: Shekar Babu Suryanarayana, Bangalore (IN); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/380,675

(22) Filed: Jul. 20, 2021

(51) Int. Cl.
*G06F 1/00* (2006.01)
*G06F 1/3287* (2019.01)
*G06F 11/30* (2006.01)
*G06F 1/28* (2006.01)
*G06F 1/3206* (2019.01)

(52) U.S. Cl.
CPC .............. *G06F 1/3287* (2013.01); *G06F 1/28* (2013.01); *G06F 1/3206* (2013.01); *G06F 11/3062* (2013.01)

(58) Field of Classification Search
CPC ........ G06F 1/3287; G06F 1/28; G06F 1/3206; G06F 11/3062
See application file for complete search history.

(56) References Cited

U.S. PATENT DOCUMENTS

| 2016/0127308 A1* | 5/2016 | Yu ...................... H04W 52/0235 |
| | | 709/219 |
| 2018/0173294 A1* | 6/2018 | Kotary ................... G06F 9/4418 |
| 2019/0073023 A1* | 3/2019 | Kosugi ................... G06F 1/206 |

* cited by examiner

*Primary Examiner* — Nitin C Patel
(74) *Attorney, Agent, or Firm* — Jackson Walker L.L.P.

(57) ABSTRACT

An information handling system may include at least one processor; and a non-transitory, computer-readable medium having computer-executable code thereon that is executable by the at least one processor to cause the information handling system to: enter a power saving mode; return from the power saving mode to a normal operating mode based on a wake event; determine that the wake event was erroneous; and in response to determining that the wake event was erroneous, execute a remedial action relating to the power saving mode.

20 Claims, 4 Drawing Sheets

ADAPTIVE REMEDIATION FOR MODERN STANDBY

TECHNICAL FIELD

The present disclosure relates in general to information handling systems, and more particularly to addressing shortcomings in power saving modes of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems (in particular portable systems such as phones, tablets, laptops, notebooks, etc.) include the ability to enter one or more power saving modes. For example, S1 and S2 are referred to as sleep modes, S3 is a standby mode, S4 is a hibernate mode, etc. Some systems include a "Modern Standby" (MS) mode which allows for instant-on functionality. For the sake of clarity and concreteness, the example of Modern Standby will be discussed in detail herein. One of ordinary skill in the art with the benefit of this disclosure will understand its applicability to other power saving modes as well.

Problems can arise when a system fails to enter MS when it should, or when it erroneously exits from MS when it should not. In such situations, unnecessary battery drain and overheating can occur. For example, after the lid of a laptop system has been closed, a fake or erroneous resume event can cause the system to return from MS to normal operation, and then it may not return to MS. This may cause the system to overheat (e.g., if it is in an enclosed space such as a bag).

There is no existing solution for detecting such fake resume events and preventing a system from exiting from MS. There is also no existing solution for sending a user notifications when a system fails to stay in MS. There is also no existing solution for proactively and intelligently taking a desired action upon failure of MS.

It is to be noted that various terms discussed herein are described in the ACPI Specification Version 6.4, which was released in January 2021 (hereinafter, ACPI Specification), which is hereby incorporated by reference in its entirety. One of ordinary skill in the art with the benefit of this disclosure will understand its applicability to other specifications (e.g., prior or successor versions of the ACPI Specification). Further, some embodiments may be applicable to different technologies other than ACPI.

It is to be further noted that various terms discussed herein are described in the UEFI Specification version 2.9, which was released in March 2021 (hereinafter, UEFI Specification), which is hereby incorporated by reference in its entirety. One of ordinary skill in the art with the benefit of this disclosure will understand its applicability to other specifications (e.g., prior or successor versions of the UEFI Specification). Further, some embodiments may be applicable to different technologies other than UEFI.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with power saving modes in information handling systems may be reduced or eliminated.

In accordance with embodiments of the present disclosure, an information handling system may include at least one processor; and a non-transitory, computer-readable medium having computer-executable code thereon that is executable by the at least one processor to cause the information handling system to: enter a power saving mode; return from the power saving mode to a normal operating mode based on a wake event; determine that the wake event was erroneous; and in response to determining that the wake event was erroneous, execute a remedial action relating to the power saving mode. In accordance with these and other embodiments of the present disclosure, a method may include an information handling system entering a power saving mode; the information handling system returning from the power saving mode to a normal operating mode based on a wake event; the information handling system determining that the wake event was erroneous; and in response to determining that the wake event was erroneous, the information handling system executing a remedial action relating to the power saving mode.

In accordance with these and other embodiments of the present disclosure, an article of manufacture may include a non-transitory, computer-readable medium having computer-executable code thereon that is executable by a processor of an information handling system for: entering a power saving mode; returning from the power saving mode to a normal operating mode based on a wake event; determining that the wake event was erroneous; and in response to determining that the wake event was erroneous, executing a remedial action relating to the power saving mode.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
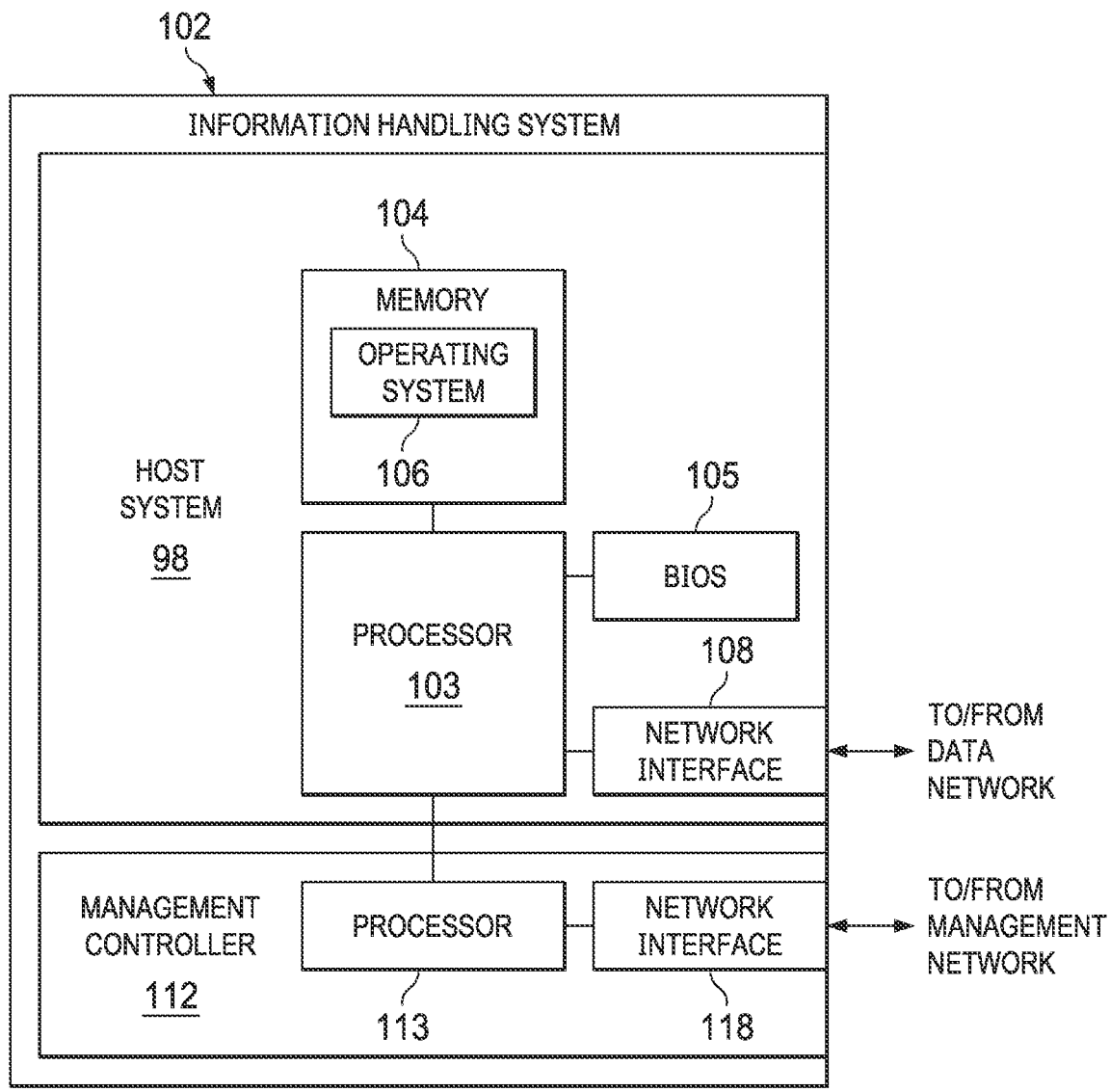
FIG. 1 illustrates a block diagram of an example information handling system, in accordance with embodiments of the present disclosure.

Preferred embodiments and their advantages are best understood by reference to FIGS. 1 through 4, wherein like numbers are used to indicate like and corresponding parts. For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "couple-able" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, an embedded controller (EC), a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure may address various shortcomings in power saving modes of information handling systems such as information handling system 102.

In particular, some embodiments of this disclosure may allow for intelligently taking desired action(s) upon a failure of MS. For example, before taking any additional actions, a system may automatically attempt to re-enter MS again. If the same problem persists, an action may be taken such as closing (or force-closing) all applications and issuing a shutdown command. In these and other embodiments, the system may also respond by entering a different low-power state such as S3, S4, etc.

In these and other embodiments, an OS-independent interactive remote method may intelligently detect MS failure and take remediation action(s). For example, the system may start an interactive remote management session with another information handling system (e.g., a phone or watch of a user) to send MS failure notifications and receive external commands (e.g., via Bluetooth or a network connection) relating to remediation. For example, the system may attempt to re-enter MS after a remediation action such as prompting a user to force-close all applications. In these and other embodiments, the system may also respond by entering a different low-power state such as S3, S4, etc.

In some embodiments, a targeted resolution may be implemented such as power cycling the system when a device such as a USB port or hub is detected that is causing MS failures. Logging and/or telemetry actions may also be used to track wake events and durations.

In some embodiments, an interactive command may be used to cause an embedded controller (EC) of the system to throttle performance to prevent overheating. In some embodiments, fake or invalid wake events may be detected, and notifications may be sent to a user via another device (e.g., a phone, watch, etc.) so that the user can manually investigate and take some remedial action. For example, in one embodiment, a wake event that occurs while the lid of a laptop remains closed (or while any other sensor indicates that the system should not be woken from MS) may be considered a fake or invalid wake event.

Figure 2:
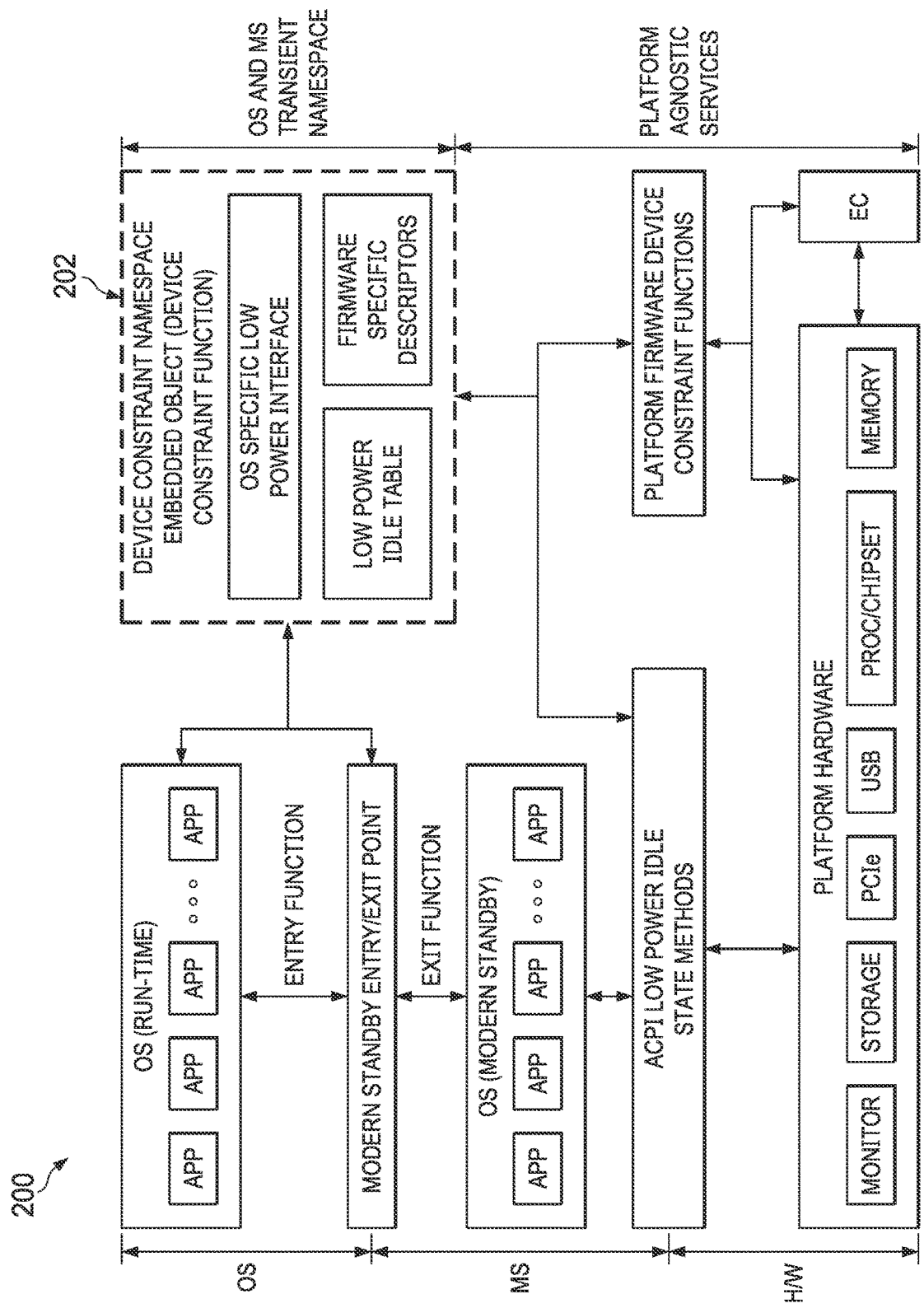
FIG. 2 illustrates a block diagram of an example architecture, in accordance with embodiments of the present disclosure.

Turning now to FIG. 2, an example architecture 200 is shown. Some embodiments of this disclosure may enable operating system (OS) interaction with the hardware platform via the use of an ACPI Device Constraint Embedded Namespace Object, which may implement a method referred to herein as a _DCF (Device Constraint Function) method 202, which may be exposed through the namespace. The Embedded Object may also include a _CID (Compatible ID) object for a namespace shared interface between OS transmission to MS states and platform agnostic services.

The Embedded Namespace Object may be a "transient" function (e.g., an intermediate object that exists between the OS and the platform hardware) that may exist both in OS space as well as in non-OS scenarios. Thus the Embedded Namespace Object may interact with the platform hardware directly, and it may also leverage OS functionality to perform some tasks. This object may be initialized during the pre-boot DXE phase in one embodiment, and the namespace may be created during the first boot. Upon subsequent boots, the namespace may be initialized and passed to an OS runtime using the ACPI _DCF method.

Figure 3:
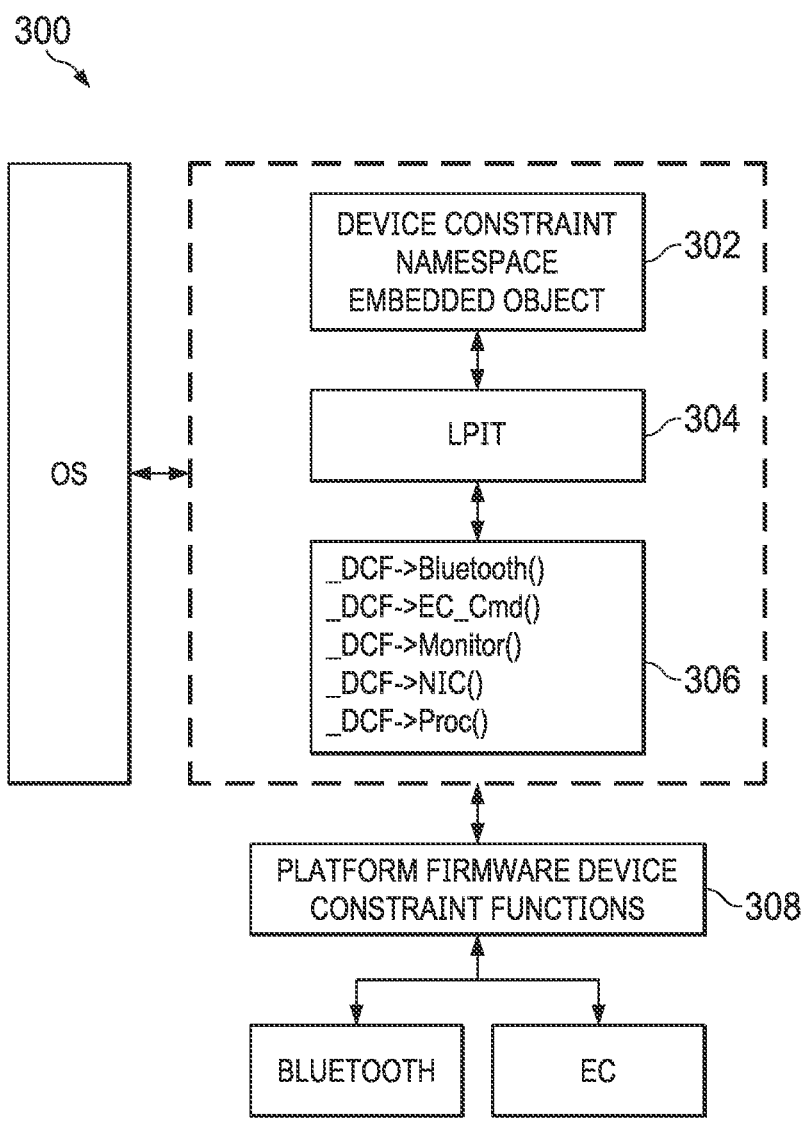
FIG. 3 illustrates a block diagram of an example architecture, in accordance with embodiments of the present disclosure.

Turning now to FIG. 3, another example architecture 300 is shown, according to some embodiments. A Device Constraint Namespace Embedded Object 302 implements an ACPI Low Power Idle Table (LPIT) 304 and various Firmware Specific Descriptors 306 to support OS-specific Low Power Interface and Platform Firmware Device Constraint Functions 308.

In one embodiment, an OS-Specific Low Power Object may be used to handle all OS-level low-power states and notifications. This object may also monitor the MS entry and exit, a display state (on/off), and notifications. The object may further interface with Firmware Specific descriptors to provide additional capabilities at OS entry and exit into the MS state as well OS-level capabilities.

To enumerate platform Low Power Idle states, architecture 300 includes the use of LPIT 304. LPIT 304 may consist of a standard ACPI header followed by a series of one of more LPI State descriptors. The table resides outside the OS memory map for ACPI _DCE method access to provide embedded services from the pre-boot and/or EC perspective. Additional characteristics implemented may include entry trigger, residency and latency requirements, and associated residency counter descriptors.

Firmware Specific Descriptors 306 may implement the Device Constraint Functions. With these descriptors specific to a device, the corresponding power status can be obtained and managed. For each platform device in a Low Power S0 Idle system, for example, the Platform Idle State constraints may be specified in terms of minimum D state or device-specific state. The constraint is satisfied if the device enters the target state or a deeper device state. In other words, if a device-specific state is described as a constraint, then the constraint is met if the device transitions to either the described device-specific state or a deeper D-state. A Device enabled/disabled parameter may enable the BIOS to enumerate all possible devices and dynamically enable/disable them as needed during BIOS initialization.

The Device Constraint Namespace Embedded Object 302 has the capability of living outside of the scope of the OS, and so it can implement virtual out-of-band external/network command execution support. Device Constraint Namespace Embedded Object 302 may implement a network interface for a Bluetooth stack and an interface to the EC. Thus a lightweight Bluetooth protocol can run to discover devices, send messages, and receive commands/instructions from connected Bluetooth devices. The EC interface may be used to control platform power attributes from different sensors. The Bluetooth interface may be used to couple to another device of a user such as a phone or watch, providing notifications and/or interactive options about what actions should be taken when a MS failure occurs. For example, the user can be provided with various options (attempt to re-enter MS, force-close all applications and shut down, force hibernation, etc.), and the selected option can then be implemented.

Figure 4:
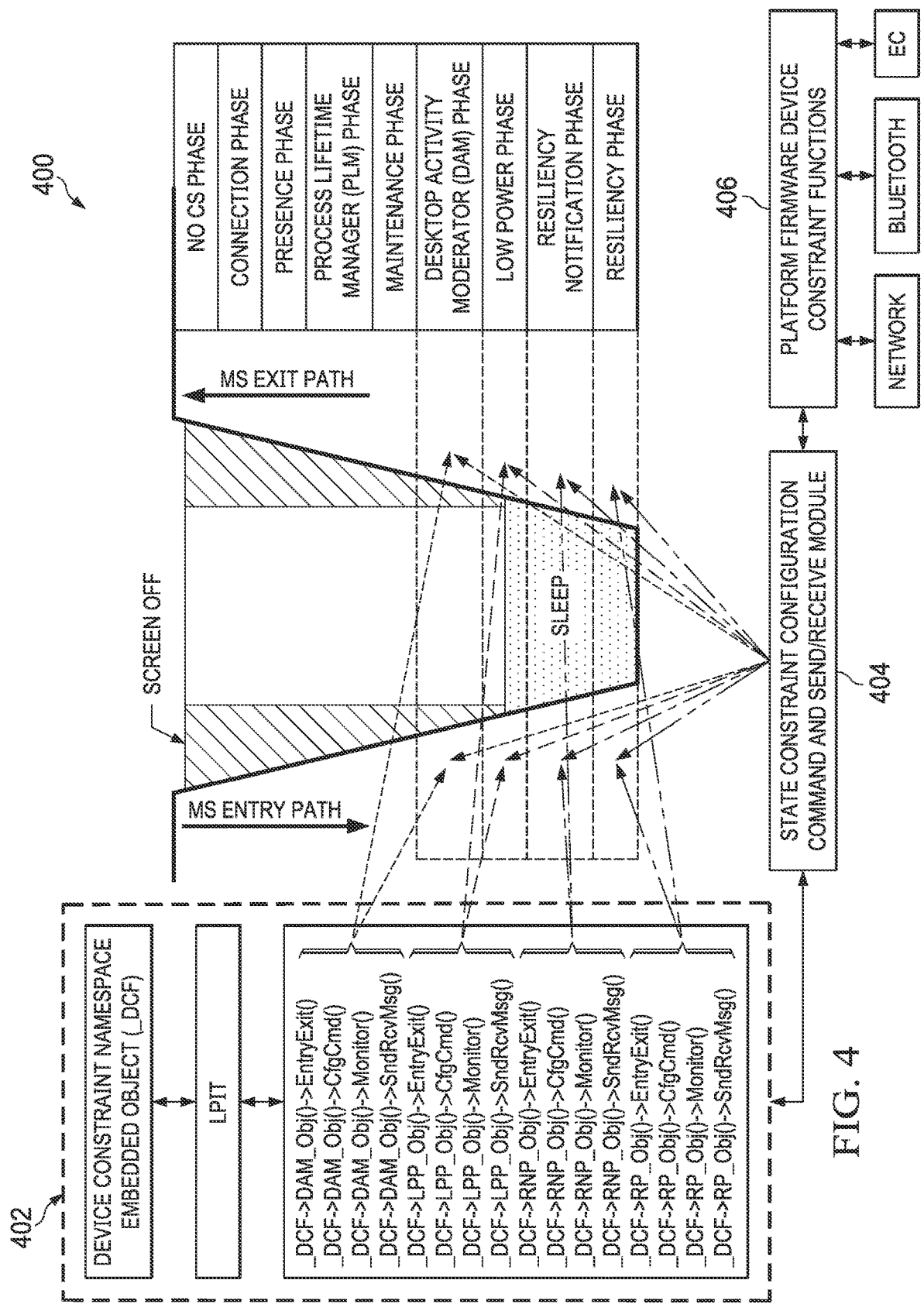
FIG. 4 illustrates a state diagram, in accordance with embodiments of the present disclosure.

Turning now to FIG. 4, a vertical state diagram 400 is shown to illustrate various actions that may occur upon entry/exit to MS. At the top of state diagram 400, an information handling system is in an ordinary operating state, and it proceeds downward through various phases during the MS entry path to reach MS at the bottom of state diagram 400. Further, during the MS exit path, the system proceeds upward through the various phases to return to an ordinary operating state. The phases illustrated in state diagram 400 are described in more detail in the Modern Standby documentation, but briefly they may be described as follows:

No-CS phase: The system is waiting either to idle out or for outstanding power requests from applications. It has not yet begun quiescing activities. This is also the phase where the device waits for the sleep timeout to elapse and power requests to expire.

Connection phase: The system is checking for remote desktop connections.

Presence phase: Not currently used.

Process Lifetime Manager (PLM) phase: The system suspends Microsoft Store apps that are in the foreground.

Maintenance phase: The system executes maintenance tasks.

Desktop Activity Moderator (DAM) phase: The system pauses desktop applications to reduce their power consumption during standby.

Low-power phase: The system notifies registered subscribers that the power manager is entering a low-power, long-resume-latency phase. This is used by some devices as a hint to power down. This is where the system conceptually exits its Screen Off state and enters Sleep.

Resiliency notification phase: The network subsystem is notified to enter a low-power mode.

Resiliency phase: The system is ready for the processor or system-on-chip (SoC) to enter the lowest power mode and remain idle. This is where explicitly allowed, value-adding software activities can run through activators. Consequently, the system may transition between idle and active states periodically.

As shown in FIG. 4, Modern Standby, its fine-grained phases, their custom configuration commands and status notification methods, along with corresponding entry and exit functions may be implemented with a sideways Device Constraint Namespace Embedded Object 402.

The _DCF object may internally hook a state-specific dynamic function for each phase. This function may include EntryExit( ) for entry and exit status functions of every state, CfgCmd( ) to obtain and execute a remote/external configuration command, Monitor( ) to continuously monitor the status until exit from the particular state, and SndRcvMsg( ) to send notifications and receive configuration commands. For example, the DAM_Obj( ) function may correspond to the Desktop Activity Moderator Phase, the LPP_Obj( ) function may correspond to the Low Power Phase, etc.

A State Constraint Configuration Command and Send// Receive Module 404 may operate along with the MS Entry and Exit path via Platform Firmware Device Constraint Functions 406. This may provide for deep analysis of hardware to state failures and remediation functions. This object may also connect the network/Bluetooth module for external notification actions which can be implemented out-of-band via the EC.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a non-transitory, computer-readable medium having computer-executable code thereon that is executable by the at least one processor to cause the information handling system to:
   enter a power saving mode;
   return from the power saving mode to a normal operating mode based on a wake event;
   determine that the wake event was erroneous; and
   in response to determining that the wake event was erroneous, execute a remedial action relating to the power saving mode.

2. The information handling system of claim 1, wherein the power saving mode comprises Modern Standby (MS).

3. The information handling system of claim 1, wherein the remedial action comprises attempting to re-enter the power saving mode.

4. The information handling system of claim 1, wherein the remedial action comprises wirelessly coupling to another information handling system and transmitting information to the another information handling system regarding the erroneous wake event.

5. The information handling system of claim 4, wherein the remedial action further comprises receiving, via the another information handling system, instructions from a user for additional remedial actions.

6. The information handling system of claim 5, wherein the additional remedial actions include at least one action selected from the group consisting of:
   closing running applications;
   force-closing running applications;
   entering a different power saving mode; and
   powering off the information handling system.

7. The information handling system of claim 1, wherein the remedial action is executed via an Advanced Configuration and Power Interface (ACPI) Device Constraint Embedded Namespace Object.

8. A method comprising:
   an information handling system entering a power saving mode;
   the information handling system returning from the power saving mode to a normal operating mode based on a wake event;
   the information handling system determining that the wake event was erroneous; and
   in response to determining that the wake event was erroneous, the information handling system executing a remedial action relating to the power saving mode.

9. The method of claim 8, wherein the power saving mode comprises Modern Standby (MS).

10. The method of claim 8, wherein the remedial action comprises attempting to re-enter the power saving mode.

11. The method of claim 8, wherein the remedial action comprises wirelessly coupling to another information handling system and transmitting information to the another information handling system regarding the erroneous wake event.

12. The method of claim 11, wherein the remedial action further comprises receiving, via the another information handling system, instructions from a user for additional remedial actions.

13. The method of claim 12, wherein the additional remedial actions include at least one action selected from the group consisting of:
   closing running applications;
   force-closing running applications;
   entering a different power saving mode; and
   powering off the information handling system.

14. The method of claim 8, wherein the remedial action is executed via an Advanced Configuration and Power Interface (ACPI) Device Constraint Embedded Namespace Object.

15. An article of manufacture comprising a non-transitory, computer-readable medium having computer-executable code thereon that is executable by a processor of an information handling system for:
   entering a power saving mode;
   returning from the power saving mode to a normal operating mode based on a wake event;
   determining that the wake event was erroneous; and
   in response to determining that the wake event was erroneous, executing a remedial action relating to the power saving mode.

16. The article of claim 15, wherein the power saving mode comprises Modern Standby (MS).

17. The article of claim 15, wherein the remedial action comprises attempting to re-enter the power saving mode.

18. The article of claim 15, wherein the remedial action comprises wirelessly coupling to another information handling system and transmitting information to the another information handling system regarding the erroneous wake event.

19. The article of claim 18, wherein the remedial action further comprises receiving, via the another information handling system, instructions from a user for additional remedial actions.

20. The article of claim 19, wherein the additional remedial actions include at least one action selected from the group consisting of:
   closing running applications;
   force-closing running applications;
   entering a different power saving mode; and
   powering off the information handling system.

* * * * *